United States Patent
Williamson et al.

(10) Patent No.: US 10,680,503 B2
(45) Date of Patent: Jun. 9, 2020

(54) ACTIVE SCREENING FOR AN ELECTRICAL MACHINE

(71) Applicant: ROLLS-ROYCE plc, London (GB)

(72) Inventors: Stephen Williamson, Huddersfield (GB); Alexander C Smith, Holmfirth (GB); John J A Cullen, Derby (GB); Ellis F H Chong, Derby (GB)

(73) Assignee: ROLLS-ROYCE plc, London (GB)

( * ) Notice: Subject to any disclaimer, the term of this patent is extended or adjusted under 35 U.S.C. 154(b) by 525 days.

(21) Appl. No.: 15/204,443

(22) Filed: Jul. 7, 2016

(65) Prior Publication Data
US 2017/0040881 A1 Feb. 9, 2017

(30) Foreign Application Priority Data
Aug. 6, 2015 (GB) .................................. 1513884.5

(51) Int. Cl.
*H02K 55/00* (2006.01)
*H02K 11/01* (2016.01)
(Continued)

(52) U.S. Cl.
CPC ............... *H02K 55/00* (2013.01); *H02K 3/28* (2013.01); *H02K 11/01* (2016.01); *H02K 55/02* (2013.01);
(Continued)

(58) Field of Classification Search
CPC ........ H02K 11/01; H02K 55/02; H02K 55/04; H02K 55/06; H02K 3/28; H02K 55/00; Y02E 40/622; Y02E 40/625
(Continued)

(56) References Cited

U.S. PATENT DOCUMENTS

| | | | | |
|---|---|---|---|---|
| 3,242,418 A | * | 3/1966 | Mela | ......................... H01F 6/00 322/28 |
| 3,443,134 A | * | 5/1969 | Dowsett | ................. H02K 31/00 310/178 |

(Continued)

FOREIGN PATENT DOCUMENTS

| | | | |
|---|---|---|---|
| AU | 2015201800 | * | 4/2015 |
| AU | 2015201800 A1 | | 4/2015 |

(Continued)

OTHER PUBLICATIONS

Magnetic Design of Large-Bore Superconducting Quadrupoles for the AHF. (Year: 2003).*

(Continued)

*Primary Examiner* — Alfonso Perez Borroto
*Assistant Examiner* — Ahmed Elnakib
(74) *Attorney, Agent, or Firm* — Oliff PLC

(57) ABSTRACT

An electrical machine including a rotor and a stator, at least one of the rotor and stator being provided with superconducting first electrical windings; and a set of one or more screen electrical windings, provided in the form of one or more further superconducting electrical windings, arranged around and radially outward of the first electrical windings; wherein the set of screen electrical windings is arranged to be supplied with an electrical current for generating a magnetic field of suitable magnitude and phase to reduce the magnitude of the magnetic field, generated at least by the first electrical windings during operation of the electrical machine, radially outwards of the screen electrical windings.

14 Claims, 5 Drawing Sheets

(51) Int. Cl.
*H02K 55/02* (2006.01)
*H02K 55/04* (2006.01)
*H02K 3/28* (2006.01)

(52) U.S. Cl.
CPC ............ *H02K 55/04* (2013.01); *Y02E 40/622* (2013.01); *Y02E 40/625* (2013.01)

(58) Field of Classification Search
USPC .................. 310/52, 179–184, 190–191, 266, 310/112–113; 335/216, 396, 301
See application file for complete search history.

(56) References Cited

U.S. PATENT DOCUMENTS

| | | | | |
|---|---|---|---|---|
| 3,679,920 | A * | 7/1972 | MacNab | H02K 19/26 310/10 |
| 3,708,705 | A * | 1/1973 | Tinlin | F25B 9/00 310/52 |
| 3,742,265 | A * | 6/1973 | Smith, Jr. | H02K 55/00 310/126 |
| 3,764,835 | A * | 10/1973 | Luck | H02K 55/04 310/10 |
| 3,999,091 | A | 12/1976 | Kirtley, Jr. et al. | |
| 4,001,617 | A * | 1/1977 | Boyer | H02K 55/00 310/52 |
| 4,058,746 | A * | 11/1977 | Mole | H02K 55/00 310/10 |
| 4,123,676 | A * | 10/1978 | Cooper | H02K 55/04 310/52 |
| 4,191,903 | A * | 3/1980 | Brenner | H02K 3/04 310/198 |
| 4,200,831 | A * | 4/1980 | Weldon | H02K 39/00 310/266 |
| 5,751,089 | A * | 5/1998 | Stridsberg | H02K 1/185 310/266 |
| 6,002,233 | A * | 12/1999 | McCann | H02P 25/098 310/166 |
| 8,258,903 | B2 * | 9/2012 | Schnur | G01R 33/3815 324/318 |
| 10,355,549 | B1 * | 7/2019 | Haran | H02K 3/28 |
| 2011/0285244 | A1 * | 11/2011 | Lewis | A61N 7/02 310/317 |
| 2015/0214824 | A1 * | 7/2015 | Guina | H02K 55/06 310/113 |
| 2017/0040881 | A1 * | 2/2017 | Williamson | H02K 55/00 |

FOREIGN PATENT DOCUMENTS

| | | | |
|---|---|---|---|
| GB | 1133724 | A | 11/1968 |
| GB | 1343275 | * | 1/1974 |
| GB | 1343275 | A | 1/1974 |
| GB | 1360792 | A | 7/1974 |
| WO | 2013/086558 | A1 | 6/2013 |

OTHER PUBLICATIONS

Feb. 11, 2016 Search Report issued in British Patent Application No. 1513884.5.
Douine, B. et al., "Improvement of YBCO Superconductor Magnetic Shielding by Using Multiple Bulks," Journal of Superconductivity and Novel Magnetism, (2013), Version 1-11, pp. 1-4.
St. Lorant, S.J., "Superconducting Shields for Magnetic Flux Exclusion and Field Shaping," Stanford Linear Accelerator Center, Stanford University, pp. 227-232.
Kashikhin, V.S. et al., "Conceptual Design of Large-Bore Superconducting Quadrupoles with Active Magnetic Shielding for the AHF," Proceedings of the 2003 Particle Accelerator Conference, pp. 1966-1968.
Oct. 19, 2016 Search Report issued in European Patent Application No. 16178349.

* cited by examiner

ACTIVE SCREENING FOR AN ELECTRICAL MACHINE

FIELD OF THE INVENTION

The present invention relates to active screening for an electrical machine, in particular for an electrical machine having superconducting stator and/or rotor windings.

BACKGROUND OF THE INVENTION

Conventional electrical machines, such as generators and motors, use a magnetic stator core to provide a low reluctance path for the magnetic fields created by the excitation source. The outer diameter of the stator core is formed of a continuous ring of electrical steel (known as the core-back) of sufficient radial depth to ensure, by design, the magnetic permeability is high. As a direct result, very little magnetic field exists outside the outer diameter of the stator. In this respect the core-back acts as an effective environmental magnetic screen for the magnetic fields generated and contained within the machine.

However, superconducting electrical machines operate at significantly higher magnetic fields levels than non-superconducting electrical machines. The high field levels mean that a conventional stator core-back saturates magnetically causing its magnetic permeability to reduce so that significant magnetic fields exist outside the stator core. This means that existing core-back designs are not effective for such superconducting electrical machines, leading to the presence of significant magnetic field levels external to the outer diameter of the machine. This represents an environmental hazard in the vicinity of superconducting machines.

It is also possible that non-magnetic stator cores may be employed in superconducting electrical machines, in which case an environmental screen is almost certainly a necessary requirement.

Conventional design techniques may be used for superconducting electrical machines, for example by increasing the size of the core-back. But this leads to a significant increase in the radial depth of the required core-back, resulting in an undesirable increase in the size and weight of the machine.

Passive screening could be used either in the form of a high permeability ring of material such as steel or a high electrical conductivity material such as copper or aluminium.

However, such passive screening adds significant weight and/or electrical losses to the superconducting machine, which are undesirable.

SUMMARY OF THE INVENTION

Accordingly, the present invention provides an electrical machine as set forth in claim 1.

The use of superconducting screen electrical windings ensures the weight and losses are greatly reduced within the machine; and the current supplied to the set of screen electrical windings ensures it is an ideal environmental magnetic screen under all operating load conditions of the superconducting machine.

The set of screen electrical windings may be arranged to be supplied with an electrical current for generating a magnetic field of suitable magnitude and phase to reduce (radially outwards of the screen electrical windings) the magnitude of the magnetic field, generated by the first electrical windings and any other windings provided on the rotor and/or stator during operation of the electrical machine.

The set of screen electrical windings may be arranged to be supplied with an electrical current for generating a magnetic field to oppose the magnitude and phase of the magnetic field generated at least by the first electrical windings during operation of the electrical machine, so as to reduce radially outwards of the screen electrical windings the magnitude of the magnetic field generated at least by the first electrical windings during operation of the electrical machine.

The set of screen electrical windings may be arranged to be supplied with an electrical current for generating a magnetic field to oppose the magnitude and phase of the magnetic field, generated by the first electrical windings and any other windings provided on the rotor and/or stator during operation of the electrical machine, so as to reduce radially outwards of the screen electrical windings the magnitude of the magnetic field generated by the first electrical windings and any other windings provided on the rotor and/or stator during operation of the electrical machine.

The screen electrical windings may be arranged to be supplied with an electrical current from a source electrically isolated from the first electrical windings.

The set of screen electrical windings may be provided in electrical series with the first electrical windings. Accordingly, the set of screen electrical windings may be arranged to generate a magnetic field to oppose the magnitude and phase of the magnetic field, generated at least by the first electrical windings during operation of the electrical machine.

A second set of screen electrical windings may be arranged around and radially outward of the said set of screen electrical windings.

The second set of screen electrical windings may be provided in the form of one or more yet further superconducting electrical windings.

The first and second set of screen electrical windings may be cooperatively arranged in the form of a superconducting Gramme Ring Winding. The Gramme Ring Winding may be provided with the same number of poles as the stator and rotor windings.

However, the second set of screen electrical windings may be provided in the form of one or more non-superconducting electrical windings.

In any event, the second set of screen electrical windings may be arranged to be supplied with an electrical current for generating a magnetic field of suitable magnitude and phase to reduce, radially outwards of the second set of screen electrical windings, the magnitude of the magnetic field generated during operation of the electrical machine by any (all) windings provided on the rotor.

The second set of screen electrical windings may be arranged to be supplied with an electrical current for generating a magnetic field to oppose the magnitude of the magnetic field generated during operation of the electrical machine by any windings provided on the rotor, so as to reduce, radially outwards of the second set of screen electrical windings, the magnitude of the magnetic field generated during operation of the electrical machine by any (all) windings provided on the rotor.

The second set of screen electrical windings may include one or more multi-phase coil windings. The or each set of screen electrical windings may include one or more superconducting multi-phase coil windings.

Preferably, the first electrical windings are provided on the stator. The windings on the rotor may be superconducting. The windings on the rotor may not be superconducting.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
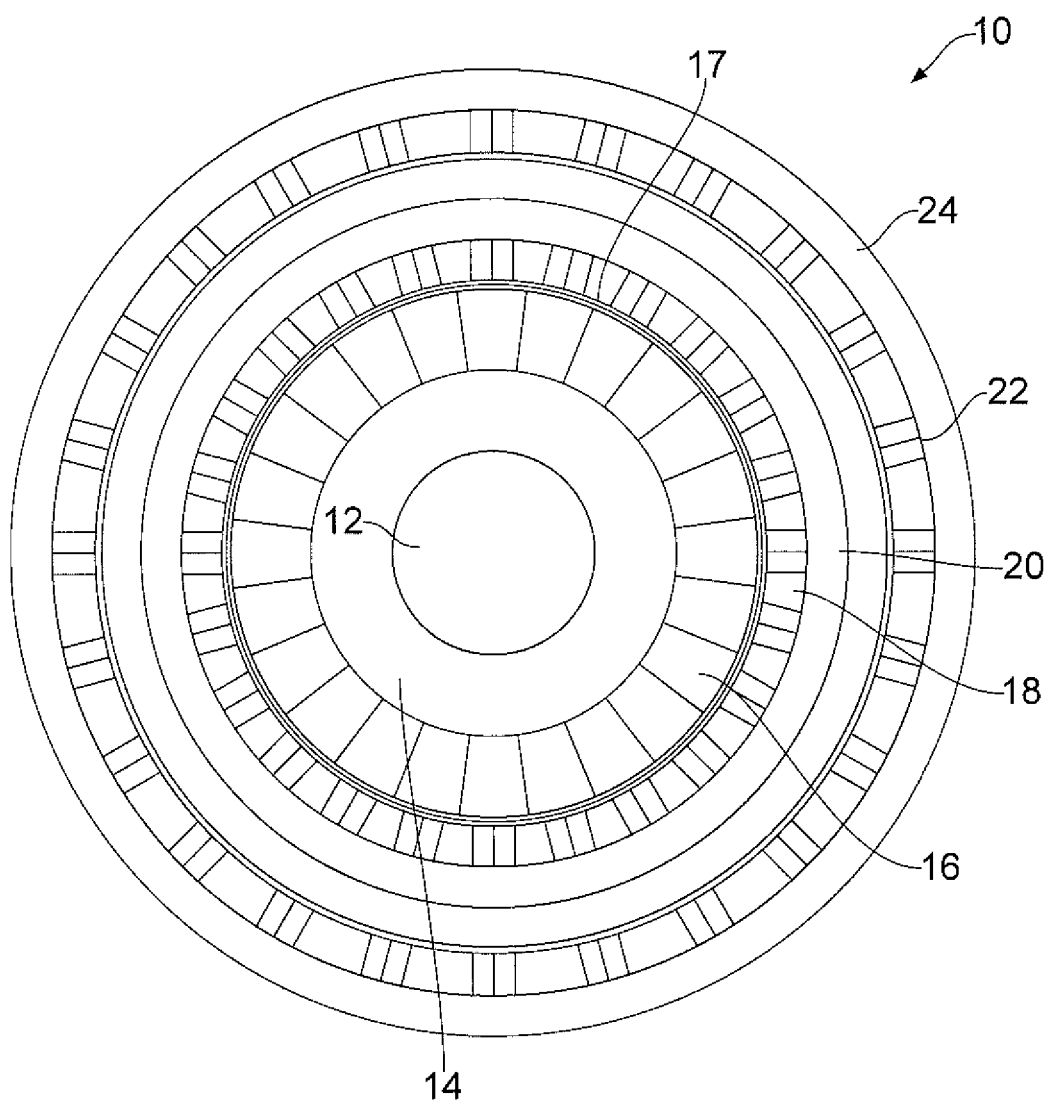
FIG. 1 shows a first embodiment of the present invention.

FIG. 1 shows a first embodiment of a rotary electrical machine 10 according to the present invention, having a rotor assembly comprising a rotatable shaft 12 on which is mounted (to be rotatable with the shaft) a rotor core 14 provided with a set of one or more rotor windings 16 mounted on the rotor core 14 to be formed around and radially outward of a main body of the rotor core. The rotor core typically comprises a plurality of teeth around which the rotor windings 16 are wound. The rotor assembly is rotatable about an axis of rotation. Rotation of the shaft results in corresponding rotation of the rotor core 14 and the set of rotor windings 16. The rotor windings 16 may be provided in the form of superconducting rotor windings.

Around and radially outward of the rotor there is provided a gap, such as an air gap 17, may be provided between the stator and rotor.

The stator comprises a set of one or more stator windings 18 provided on a stator core 20, to be formed radially inward of a main body of the stator core. In the present embodiment the stator windings 18 are provided in the form of superconducting windings, i.e. the windings are formed of a superconducting material. The core 20 is typically salient, comprising a plurality of generally radially inwardly extending teeth around which the stator windings 18 are wound.

Around and radially outward of the stator core 18 and the set of stator windings 18 is provided a set of one or more screen windings 22 provided on a screen winding core 24, the windings 22 being radially inward of a main body of the screen winding core 24. Again, the screen core 24 is typically salient, having generally radially inwardly extending teeth around which the screen windings 22 are wound.

The screen windings 22 are provided in the form of one or more superconducting windings, i.e. they are formed of superconducting material.

The stator is provided in the general form of a cylinder, and is arranged to be coaxial with the rotational axis of the rotor.

The set of screen windings is provided generally in the form of a cylinder coaxial with the rotational axis of the rotor.

The screen winding core is provided generally in the form of a cylinder coaxial with the rotational axis of the rotor.

Preferably, the set of screen windings 22 and the screen winding core 24 extend in both directions along the rotational axis of the rotor to at least the same extent as the windings 16, 18 provided respectively on the rotor and stator.

In this first embodiment the set of screen windings 22 is supplied with an external electrical supply to control the screening current in the screen windings. Control of the screen winding current separate to the current in the superconducting stator winding 18 (i.e. electrically insulated from the stator windings 18) allows the screen winding to be positioned as preferred (e.g. radially close to the stator winding structure) and provides effective environmental screening for both the stator and rotor magnetic fields in all load conditions. The external electrical supply controls the current in the screen windings 22 such that the fundamental (space) component of the external magnetic field produced by the combination of the windings 16, 18, 22 is eliminated, For simplicity of explanation only one machine winding (say the stator winding 18) will be assumed, and likewise only one screening winding at item 22 will be assumed. It will then be understood by extension how the magnetic field of the rotor winding could be cancelled by introducing a screening winding for the rotor winding and injecting a suitable current into it.

The magnetic field (B in tesla) at a distance r (in metres) from the machine's axis depends on several key factors. These are:—

1. The radius R (in meters) from the machine's axis at which the winding is situated;
2. The number of turns N in the winding where N is a dimensionless number
3. The instantaneous magnitude I in amps of the current in the winding;
4. The number of pole pairs (P) in the winding where P is a dimensionless number;
5. The angle (t) measured in radians in the circumferential direction from some radial reference line (usually a line along which the radial component of the magnetic field is strongest).

Mathematically this can be expressed as follows:—

B=f(r, t, R, N, I, P) where 'f' is a (complicated) formula involving the variables or parameters r, t, R, N, I, and P. There will be one formula (say f1) for the radial component of the magnetic field and another formula (say f2) for the circumferential component. Here we will use just 'f' for simplicity of description, but it is to be understood that in reality either formula f1 or formula f2 would be used depending upon whether the radial or circumferential field component is being cancelled. Specific formulae are provided below under the heading mathematical analysis.

Using postscripts 'w' for the stator winding 18 and 's' for the screening winding 22, we find that the net magnetic field (Bnet) at the field point (r,t) is made up from two factors:— firstly, Bw=f(r, t, Rw, Nw, Iw, Pw) and secondly Bs=f(r, t, Rs, Ns, Is, Ps).

If the screening current (Is) is chosen to be of such a magnitude that Bs=−Bw then we note that the net field Bnet=Bw+Bs=Bw+(−Bw)=0 and the field has, as required, been cancelled or reduced to zero.

Note that for effective screening:—
a) Ps=Pw;
b) the formulae f1 and f2 are, on physical grounds, linear in the parameters N and I provided there is no magnetically saturating iron in the circuit. Thus, for example, doubling the number of turns in the winding and halving the current in it leaves the magnetic field magnitude unchanged;

c) the stator winding usually carries an AC current of a given frequency. Thus the screening winding will also carry an AC current of the same frequency, phase angle, and phase rotation.

The screening of the rotor winding 16 has one minor difference from the above since this winding usually carries DC current and is mounted on the rotating rotor body or core 14. The magnetic field at the field point (r,t) where cancellation is to occur perceives the rotating rotor as, in effect, carrying an AC current. Thus the screening current must again be AC of the correct frequency, phase angle and phase rotation as the apparent rotor field.

The above description applies to a two dimensional model of the machine's magnetic field (i.e. in the radial and circumferential directions) because the field in the third or axial or z-direction is usually small and can thus be ignored.

Figure 2:
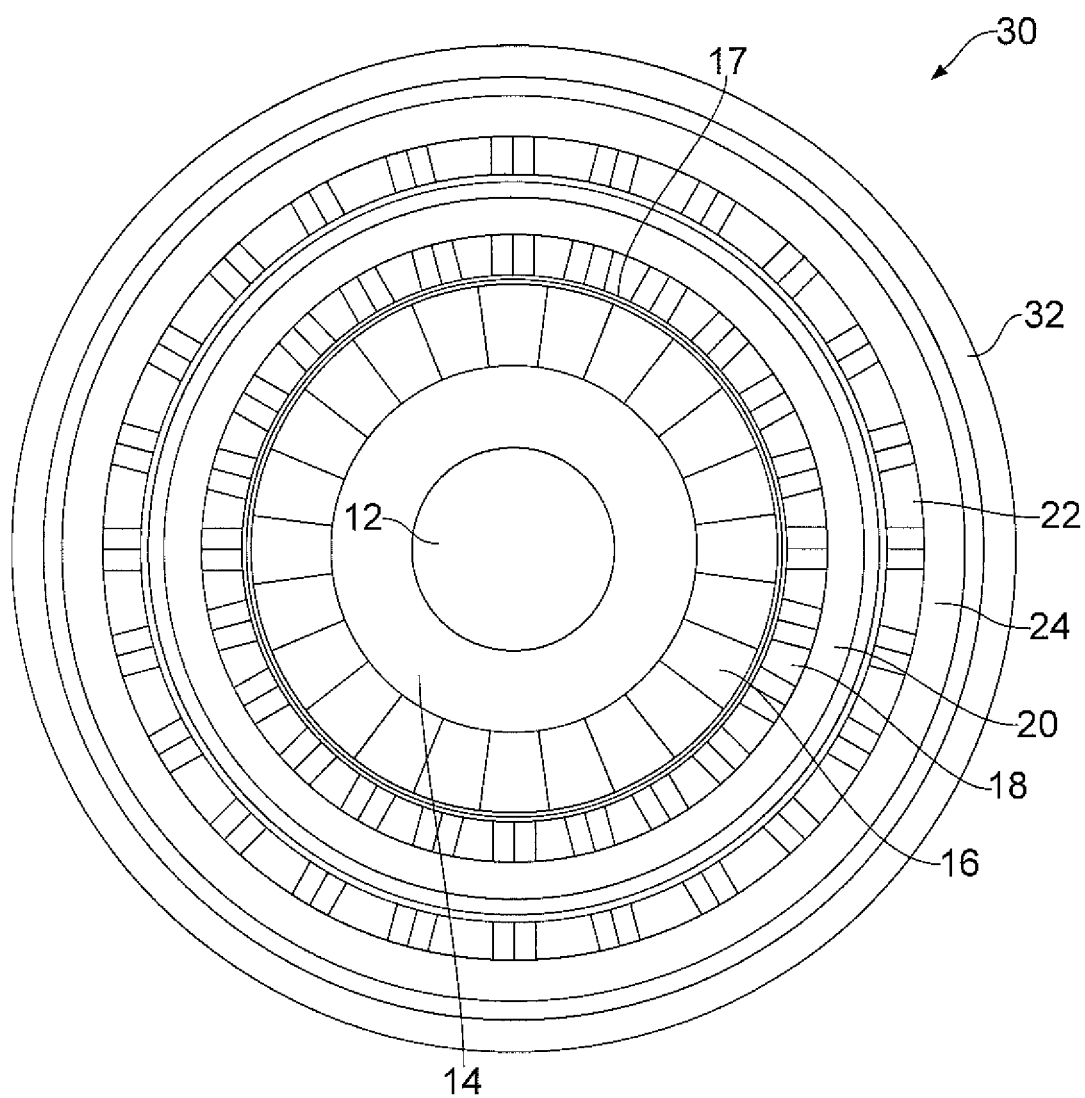
FIG. 2 shows a second embodiment of the present invention.

FIG. 2 shows a second embodiment of a rotary electrical machine 30 according to the present invention. Electrical machine 30 is arranged generally similarly to electrical machine 10 described above, and thus similar reference numerals are used when describing this second embodiment to the first embodiment described above and the figures.

However, dissimilarly to the first embodiment above, in the second embodiment the set of screen windings 22 is not supplied with external electrical supply, but instead is connected in electrical series with the stator windings 18. Furthermore, a (further) second set of screen windings 32 is provided. The second set of screen windings 32 is preferably provided around and radially outward of the set of screen windings 22. However, the second set of screen windings 32 could in principle be provided concentrically radially between stator windings 18 and the set of screen windings 22.

In this second embodiment, the second set of screen windings 32 is provided in the form of superconducting windings, i.e. the second set of screen windings 32 is formed of a superconducting material.

The set of screen windings 22 is connected in series with the superconducting stator winding, such that its screening effect is automatically adjusted in both magnitude and phase to oppose the stator current and provides effective environmental screening for the stator magnetic field in all load conditions.

Whereas, the second set of screening windings is connected to an external supply which controls its current to provide effective environmental screening for the rotor magnetic field in all load conditions.

As explained above, the net magnetic field 'Bnet' at any given point outside the machine [defined by radius 'r' from the machine's axis and angle 't' from a reference radial line] is made up from two components, one (postscripted 'w') due to the current in the stator winding 18 and the other (postscripted 's') due to the current in the screening winding 22. Thus we have using this terminology:—

$$Bnet=Bw+Bs$$

where
Bw=f(r, t, Rw, Nw, Iw, Pw) and
Bs=f(r, t, Rs, Ns, Is, Ps).

As was noted in the first embodiment that for effective screening Pw=Ps; this is true also of the second embodiment.

This second embodiment has the two windings in series and thus the currents in them (Iw in the stator winding 18 and Is in the screening winding 22) are identical; they are the same current and so Iw=Is.

Nevertheless, by making a suitable choice during the design stage of Ns (i.e the number of turns in the screening winding 22) it is possible to attain Bnet=Bw+Bs=0 for any given Rs (i.e. the radius of the screening winding).

A further requirement (common with the first embodiment) is that the two windings (18 and 22) should be circumferentially aligned so as to avoid the magnetic field of one winding being rotated with respect to the other.

By contrast with the above (where the current in the first screening winding 22 is used to cancel the effect of the current in the stator winding 18), the current in the second screening winding 32 is used to cancel the effect of the current in the rotor winding 16. Usually the rotor is rotating and the rotor winding carries direct current (i.e. DC). In such circumstances, the second screening winding must carry an alternating current (or AC) of the correct frequency, magnitude and phase angle to cancel the field of the rotor winding current. There must also be the same number of poles in the screen winding as there are poles on the rotor winding—this also applies to the first embodiment when a screen winding is being used to cancel the rotor current's field.

The frequency of the current in the second screen 32 is directly proportional to the rotational speed of the rotor. The magnitude of the current in the second screen is directly proportional to the magnitude of the current in the rotor winding (provided there is no magnetically saturable material in the machine). The phase angle of the current in the second screen varies linearly with the relative angular positions (with respect to the machine's rotational axis) of the rotor and the second screen. This would also apply to the first embodiment if a screening winding current was used to cancel the magnetic field of the rotor winding current.

A third embodiment is similar to the second embodiment shown in FIG. 2, except that the second set of screen windings 32 is not provided in the form of superconducting windings. In other words, the second set of screen windings 32 is not formed of a superconducting material. For example, the second set of screen windings 32 may be formed of copper.

Figure 5:
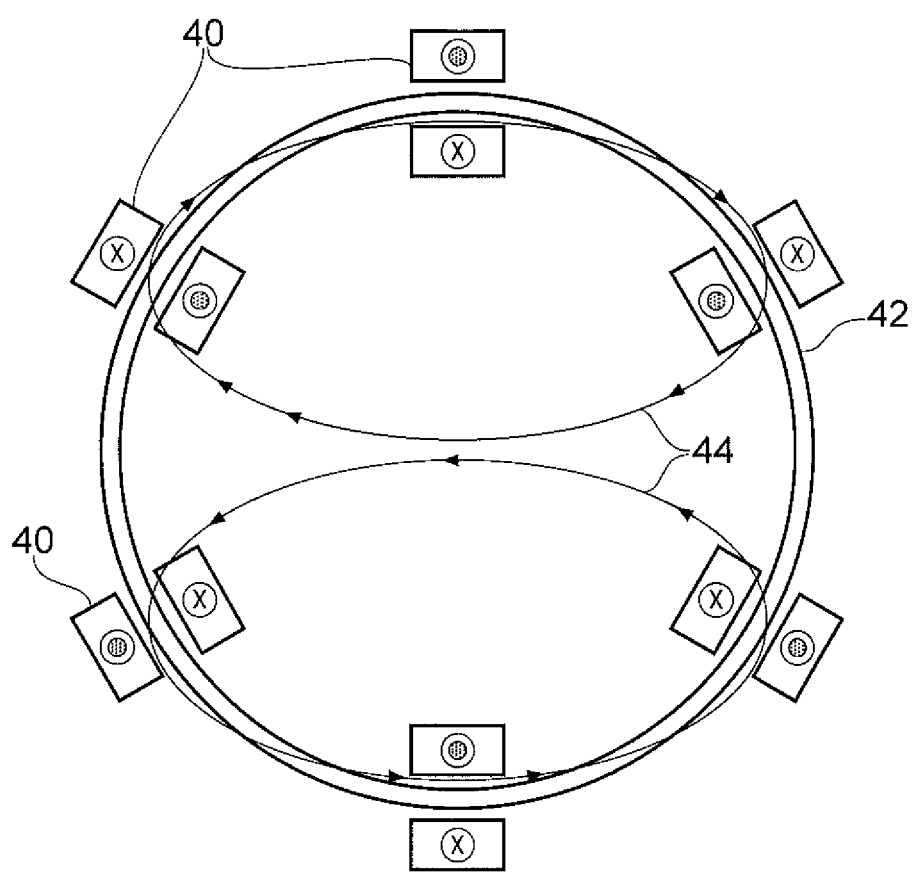
FIG. 5 shows an embodiment include a Gramme winding ring arrangement.

In a further embodiment shown in FIG. 5, which is based on the general arrangement shown in FIG. 2, the two sets of screen windings can be combined as one set (preferably poly-phase) of screen windings in the form of a superconducting Gramme Ring winding (GRW), preferably having the same number of poles as the stator and rotor windings. The magnitude and direction of the current(s) in the GRW are chosen to attract the magnetic flux (from the stator and rotor) radially outwards across the air-gap and into the GRW. The flux can then be channelled in the circumferential direction between the two screen windings before returning radially inward back towards the stator and rotor windings. This alternative embodiment screens the outside world from the superconducting machine's magnetic fields but also enhances (increases) the radial magnetic field at the stator winding (whereas the other embodiments usually tend to reduce the radial field). This enhancement of the radial field allows a more power dense superconducting machine to be designed.

The embodiment illustrated in FIG. 5 shows a three-phase 2-pole Gramme Ring Winding arrangement, having a series of windings 40, preferably three-phase windings, arranged radially outwards of the superconducting machine (not shown in FIG. 5 for simplicity). The windings are preferably wound around a non-magnetic core 42, e.g. an air core.

The three phase windings are shown according to the usual convention, in which an "x" denotes the winding is wound or inserted in the direction out of the plane of the paper, and an "•" denotes the winding is wound or inserted in the direction into the plane of the paper.

Each phase winding of the GRW is made in the form of a tube (e.g. of roughly rectangular section or, more accurately, a segment of a circle) that can be thought of as channelling ("sucking") the magnetic flux from the superconducting machine in at one end of the GRW phase winding and directing ("blowing") the flux out at the GRW phase's other end, thereby returning the flux to the superconducting machine properly. This action is represented by the arrowed paths 44 in FIG. 5. Thus, screening is achieved because the machine's magnetic flux never enters into the environment outside the GRW. Furthermore, the GRW's "suck and blow" action ensures that the magnetic fields from both the superconducting machine and the GRW cooperate to enhance the net radial flux density at the superconducting machine's stator winding thereby improving power and torque densities.

The GRW has a number of phases in order that the currents in each of these phases can be timed so as to mimic or follow the rotating magnetic field of the superconducting machine itself.

The aforementioned tubes can be provided in the form of air-cored inductors (non-magnetic-cored inductors) each of whose air-core is shaped so as to follow the circular contour of what would otherwise be the outside of the superconducting machine. Thus the current on one side of a GRW phase winding flows axially at or close to the superconducting machine's stator core outside radius; the current on the other side of the GRW phase winding also flows axially (but in the opposite direction) at or close to the superconducting machine's very outermost radius.

As will be appreciated, one of the principal concepts of the superconducting machine is that, in order for it to be a very high power density and very high torque density machine, the machine should have a high magnetic loading at the superconducting stator winding.

In the usual radial-flux machine topology (as per the descriptions above) the high magnetic loading requirement translates to a requirement for a large peak radial flux density (from the rotor winding) at the stator winding.

The embodiments discussed above which do not employ the GRW concept shown in FIG. 5 can tend to work against this large radial flux density requirement since, as measured at the stator winding, the radial component of the screening current magnetic field opposes (i.e. subtracts from) the radial component of the rotor's field. Thus, the net radial flux density at the stator winding is smaller than it otherwise would be had the screening current been absent. The addition of the optional (GRW) arrangements seeks to overcome this, and attempts to ensure that the magnetic fields from both the superconducting machine and the GRW cooperate to enhance the net radial flux density at the superconducting machine's stator winding thereby improving power and torque densities.

The proposed invention relates to an active superconducting screen situated external to the machine and encompassing the machine, e.g. in the form of a cylinder around the outer diameter, and supplied by a controlled current to ensure the external magnetic fields are negligible.

The active superconducting screen windings proposed by this invention might be composed of one or more superconducting multi-phase coil windings for example.

The use of a superconducting screen ensures the weight and losses are greatly reduced and the controlled current in the screen ensures it is an ideal environmental magnetic screen under all operating load conditions of the superconducting machine.

Exemplary features of the proposed invention are:

The active superconducting screen ensures the weight and losses are greatly reduced.

The controlled current in the screen ensures it is an ideal environmental magnetic screen under all operating load conditions of the superconducting machine.

The separate screening current allows greater flexibility in allowing the screen to be positioned at the preferred radius and to provide screening for both stator and rotor fields.

Multiple screening windings can be used to provide separate control of the screening functions for both stator and rotor fields.

The quality of being 'active' is the ability to inject currents into the screening windings during normal operation such that those screening currents are of the correct magnitude, frequency and phase angle to effectively eliminate the external magnetic field external to the machine.

The manner in which the screening currents' magnitudes, frequencies and phase angles are determined has been described above.

The 'active' screens may be distinguished from 'passive' ones in that a passive one would not have current injected into it. Instead 'passive' screens can be either short-circuited windings or hollow cylindrical structures surrounding the machine and made in both cases from either conducting (e.g. copper) or superconducting material.

In the case of 'passive' screens of conducting material, (eddy) currents are induced in the screen by a changing magnetic field (e.g from the rotating rotor or from the AC currents in the stator winding). These (eddy) currents effectively reduce the magnetic field outside the machine thereby achieving a screening effect. However, such screens are less effective at low frequencies such as low rotor speeds.

Mathematical Analysis

Figure 3:
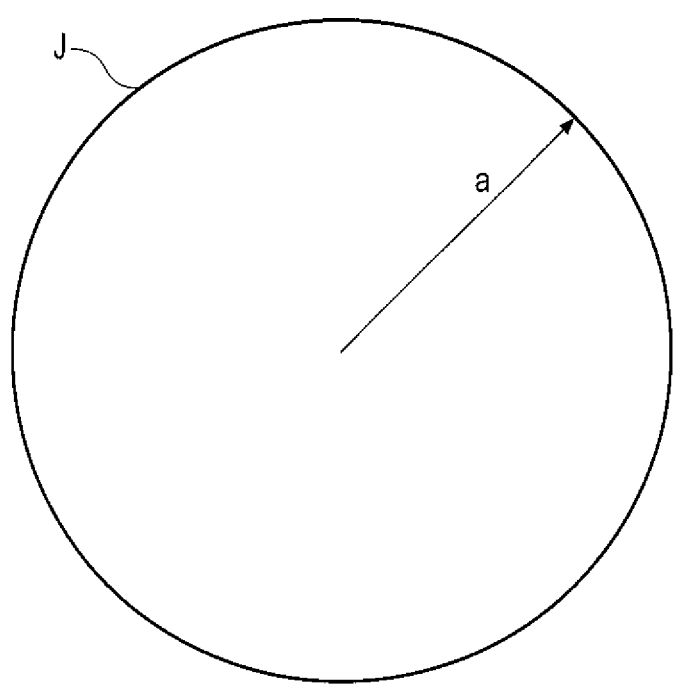
FIG. 3 shows a schematic of a machine winding forming the basis of a mathematical analysis of the generated magnetic field.

For a single winding as shown in FIG. 3, the current J in the winding can be expressed as $$J = J_s e^{j(\omega t - p\theta)} \hat{u}_z$$

On the basis that $$A = A(r) e^{j(\omega t - p\theta)} \hat{u}_z$$

Laplace: $\Box^2 A = 0$

Cylindrical Coordinates $$\frac{d^2 A}{dr^2} + \frac{1}{r}\frac{dA}{dr} - \frac{p^2}{r^2} A = 0$$

Taking a trial solution $A = cr^n$ $$\therefore n(n-1)cr^{n-2} + ncr^{n-2} - p^2 cr^{n-2} = 0$$

$$n = \pm p$$

$$\therefore A = c_1 r^p + c_2 r^{-p} \qquad \text{General solution.}$$

$$\lim_{\delta \to 0} (B_{r(r=\alpha+\delta)} = B_{r(r=\alpha-\delta)}) \qquad \text{Continuity of radial flux}$$

$$B_r = \frac{1}{r}\frac{dA}{d\theta} \quad \text{(BC1)}$$

$$\therefore \lim_{\delta \to 0}(A_{(r=a+\delta)} = A_{(r=a-\delta)})$$

$$\lim_{\delta \to 0}(H_{\theta(r=a+\delta)} - H_{\theta(r=a-\delta)}) = J_s$$

Ampere's Law $$H_\theta = -\frac{1}{\mu_0}\frac{dA}{dr} \quad \text{(BC2)}$$

$$\therefore \lim_{\delta \to 0}\left(\frac{dA}{dr_{(r=a+\delta)}} - \frac{dA}{dr_{(r=a+\delta)}}\right) = -\mu_0 J_s$$

Choose $A=0$ at $r=0$ $\therefore A=0$ at $r=\infty$ $$\therefore A = c_1 r^p \quad r \leq a$$

and $$A = c_2 r^{-p} \quad r \geq a$$

$$c_1 a^p = c_2 a^{-p} \therefore c_1 = c_2 a^{-2p} \quad \text{From BC1}$$

$$-pc_1 a^{p-1} - pc_2 a^{-p-1} = \mu_0 J_s \quad \text{From BC2}$$

From which $$c_2 = \frac{-\mu_0 J_s}{2p}a^{p+1} \text{ and } c_1 = \frac{-\mu_0 J_s}{2p}a^{-p+1}$$

$$\therefore A = \frac{-\mu_0 a J_s}{2p}\left[\frac{r}{a}\right]^p \quad r \leq a$$

and $$A = \frac{-\mu_0 a J_s}{2p}\left[\frac{a}{r}\right]^p \quad r \geq a$$

$$B_r = \frac{1}{r}\frac{dA}{d\theta} = -\frac{jpA}{r}$$

$$\therefore B_r = \frac{-j\mu_0 J_s}{2}\left[\frac{r}{a}\right]^{p-1} \quad r \leq a$$

and $$B_r = \frac{-j\mu_0 J_s}{2}\left[\frac{a}{r}\right]^{p+1} \quad r \geq a$$

These two equations represent the required general solution

Figure 4:
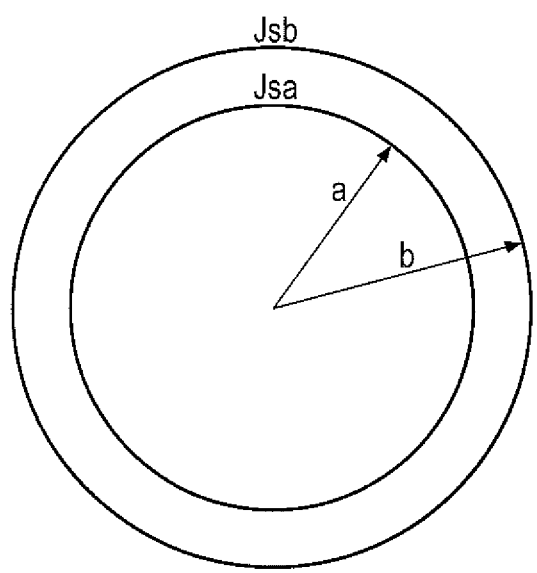
FIG. 4 shows a schematic of a machine winding and a screening winding forming the basis of a mathematical analysis of the necessary current in the screening winding to generate a magnetic field opposing the magnetic field generated by the machine winding current.

Using this analysis, and with reference to FIG. 4, we can now determine the necessary injection current Jsb in the screen winding, to generate a suitable magnetic field to oppose (match) the magnetic field generated by the machine winding current Jsa.

Superposing Solutions $$B_r = \frac{-j\mu_0}{2r^{p+1}}[J_{sa}a^{p+1} + J_{sb}b^{p+1}] \quad r \geq b$$

$$\therefore \text{ for } B_r = 0 \text{ for all } r \geq b \text{ if } J_{sa}a^{p+1} + J_{sb}b^{p+1} = 0$$

From which $$J_{sb} = -J_{sa}\left(\frac{a}{b}\right)^{p+1}$$

Therefore, the current which is required to be injected into the screening winding (Jsb) is determined as a function of the current in the machine winding.

Also $$B_r = \frac{-j\mu_0 J_{sa}}{2}\left[\frac{r}{a}\right]^{p-1}\left\{1 + \frac{J_{sa}}{J_{sa}}\left(\frac{a}{b}\right)^{p-1}\right\} \quad r \leq a$$

Substituting $$B_r = \frac{-j\mu_0 J_{sa}}{2}\left[\frac{r}{a}\right]^{p-1}\left\{1 - \left(\frac{a}{b}\right)^{p+1}\left(\frac{a}{b}\right)^{p-1}\right\} \quad r \leq a$$

From which $$B_r = \frac{-j\mu_0 J_{sa}}{2}\left[\frac{r}{a}\right]^{p-1}\left\{1 - \left(\frac{a}{b}\right)^{2p}\right\} \quad r \leq a$$

The field in the in the region $r \leq a$ is therefore attenuated by the factor $$\varepsilon = 1 - \left(\frac{a}{b}\right)^{2p}.$$

An alternative interpretation of $\varepsilon$ is that to return the working field (i.e. that in the region $r \leq a$) to its value before the screen was introduced, $J_{sa} \to J_{sa}/\varepsilon$ with a corresponding increase in $J_{sb}$.

| | Current maintained at its unscreened value | | Working field maintained at its unscreened value | |
|---|---|---|---|---|
| $\dfrac{b}{a}$ | Screen current ratio $\left\|\dfrac{J_{sb}}{J_{sa}}\right\|$ | Working field attenuation, $\varepsilon$ ($r \leq a$) | Main current ratio $\left\|\dfrac{J'_{sa}}{J_{sa}}\right\|$ | Screen current ratio $\left\|\dfrac{J'_{sb}}{J_{sa}}\right\|$ |
| 1.2 | 0.579 | 0.518 | 1.931 | 1.12 |
| 1.3 | 0.455 | 0.650 | 1.539 | 0.700 |
| 1.4 | 0.364 | 0.740 | 1.352 | 0.492 |
| 1.5 | 0.296 | 0.803 | 1.246 | 0.369 |
| 1.6 | 0.244 | 0.847 | 1.180 | 0.288 |
| 1.7 | 0.204 | 0.880 | 1.136 | 0.232 |

The above table gives some illustrative calculations for a 4-pole machine.

The left-hand half of the table is constructed with the assumption that the (magnetising) current in the machine (inner) winding remains at its un-screened value. If, for example the radius of the screening winding is 1.5 times the radius of the inner winding, then the screen current density needed to cancel the field beyond radius r=b is 29.6% of that in the inner winding, and the field in the working region (i.e. r≤a) will be reduced to 80.3% of its pre-screened value. However, if the current in the inner winding is increased by 24.6%, and the screen current density is increased to 36.9% of that in the inner winding prior to screening, the working field will be restored to its unscreened value.

The invention claimed is:

1. An electrical machine including
a rotor and a stator, at least one of the rotor and the stator being provided with superconducting electrical windings; and
a first set of screen electrical windings that comprises one or more further superconducting electrical windings wound about an axis that extends normal to a rotational axis of the rotor and that are arranged around and radially outward of the superconducting electrical windings,
wherein:
the first set of screen electrical windings is arranged to be supplied with an electrical current for generating a first magnetic field of suitable magnitude and phase to reduce a magnitude of a second magnetic field generated at least by the superconducting electrical windings during operation of the electrical machine, the second magnetic field being reduced radially outwards of the first set of screen electrical windings,
the stator is provided between the superconducting electrical windings and the first set of screen electrical windings, and
the first set of screen electrical windings has a same number of poles as the superconducting electrical winding provided on the one of the rotor and the stator.

2. The electrical machine according to claim 1 wherein the first set of screen electrical windings is arranged to be supplied with an electrical current for generating the first magnetic field of a suitable magnitude and phase to reduce a magnitude of the second magnetic field generated by the superconducting electrical windings and any other windings provided on the rotor or the stator during operation of the electrical machine, radially outwards of the first set of screen electrical windings.

3. The electrical machine according to claim 1 wherein the first set of screen electrical windings are arranged to be supplied with an electrical current from a source electrically isolated from the superconducting electrical windings.

4. The electrical machine according to claim 1 wherein the first set of screen electrical windings is provided in electrical series with the superconducting electrical windings.

5. The electrical machine according to claim 1 further comprising:
a second set of screen electrical windings that are arranged around and radially outward of the first set of screen electrical windings,
wherein the first set of screen electrical windings and the second set of screen electrical windings together have the same number of poles as the superconducting, electrical windings provided on the one of the rotor and the stator.

6. The electrical machine according to claim 5 wherein the second set of screen electrical windings comprises one or more yet further superconducting electrical windings.

7. The electrical machine according to claim 5 wherein the second set of screen electrical windings comprises one or more non-superconducting electrical windings.

8. The electrical machine according to claim 5 wherein the second set of screen electrical windings is arranged to be supplied with an electrical current for generating a third magnetic field of suitable magnitude and phase to reduce, radially outwards of the second set of screen electrical windings, a magnitude of a magnetic field generated during operation of the electrical machine by any windings provided on the rotor.

9. The electrical machine according to claim 5 wherein the second set of screen electrical windings includes one or more multi-phase coil windings.

10. The electrical machine according to claim 5 wherein the first set of screen electrical windings and the second set of screen electrical windings are cooperatively arranged to form a superconducting Gramme Ring Winding.

11. The electrical machine according to claim 1 wherein each set of screen electrical windings includes one or more superconducting multi-phase coil windings.

12. The electrical machine according to claim 1 wherein the first set of screen electrical windings carry an alternating current.

13. The electrical machine according to claim 1 wherein the first set of screen electrical windings is configured to produce a rotating magnetic field.

14. An electrical machine including
a rotor and a stator, at least one of the rotor and the stator being provided with superconducting electrical windings;

a first set of screen electrical windings that comprises one or more further superconducting electrical windings and that are arranged around and radially outward of the superconducting electrical windings; and a second set of screen electrical windings that are arranged around and radially outward of the first set of screen electrical windings, wherein:

the first set of screen electrical windings is arranged to be supplied with an electrical current for generating a first magnetic field of suitable magnitude and phase to reduce a magnitude of a second magnetic field generated at least by the superconducting electrical windings during operation of the electrical machine, the second magnetic field being reduced radially outwards of the first set of screen electrical windings, the stator is provided between the superconducting electrical windings and the first set of screen electrical windings, and the second set of screen electrical windings is not powered by the superconducting electrical windings provided on the one of the rotor and the stator.

* * * * *